US008795618B2

(12) United States Patent
Ji et al.

(10) Patent No.: US 8,795,618 B2
(45) Date of Patent: Aug. 5, 2014

(54) CHEMICAL COMPOUNDS FOR THE REMOVAL OF CARBON DIOXIDE FROM GASES

(75) Inventors: Lei Ji, Broadview Heights, OH (US); George A. Farthing, Jr., Alliance, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 563 days.

(21) Appl. No.: 13/069,204

(22) Filed: Mar. 22, 2011

(65) Prior Publication Data
US 2011/0232490 A1   Sep. 29, 2011

Related U.S. Application Data

(60) Provisional application No. 61/318,044, filed on Mar. 26, 2010.

(51) Int. Cl.
*B01D 53/14* (2006.01)
(52) U.S. Cl.
CPC .. *B01D 53/1493* (2013.01); *B01D 2252/20442* (2013.01); *B01D 2252/2041* (2013.01); *Y02C 10/04* (2013.01); *B01D 2252/20447* (2013.01); *B01D 2258/0283* (2013.01); *B01D 2252/20405* (2013.01); *B01D 53/1475* (2013.01); *Y02C 10/08* (2013.01); *B01D 2252/20426* (2013.01); *Y02C 10/06* (2013.01); *B01D 2252/20484* (2013.01); *B01D 2252/602* (2013.01); *B01D 2252/103* (2013.01)
USPC ............... 423/228; 95/236; 252/60; 252/184
(58) Field of Classification Search
None
See application file for complete search history.

(56) References Cited

U.S. PATENT DOCUMENTS 4,100,257 A * 7/1978 Sartori et al. ................. 423/226
4,112,051 A   9/1978 Sartori et al.
(Continued)

FOREIGN PATENT DOCUMENTS

CA   2750460 A1   8/2010
EP   0558019 A2   9/1993
(Continued)

OTHER PUBLICATIONS

R. Dugas and G. Rochelle, Absorption and desorption rates of carbon dioxide with monoethanolamine and piperazine, Greenhouse Gas Control Technologies 9, Proceedings of the 9th International Conference on Greenhouse Gas Control Technologies (GHGT-9), Nov. 16-20, 2008, Washington DC, U.S.A., published in Energy Procedia 1 (2009), pp. 1163-1169, Elsevier Ltd., Copyright 2009.
(Continued)

*Primary Examiner* — Duane Smith
*Assistant Examiner* — Pankti Patel
(74) *Attorney, Agent, or Firm* — Eric Marich

(57) ABSTRACT

A method and apparatus for utilizing an amine-based absorption compound for flue gas, or combustion gas, $CO_2$ capture, according to embodiments of the present invention. In some embodiments, $CO_2$ is delivered from a wet, or dry, flue gas scrubber to an absorber. The amine-based absorption compound is introduced in an aqueous solution to the absorber, which is located downstream of the wet, or dry, flue gas scrubber. In some embodiments, the $CO_2$-laden amine-based absorption compound is then subjected to a regeneration step to regenerate the $CO_2$-laden amine-based absorption compound and strip out absorbed $CO_2$. In some embodiments, energy is supplied to a stripper through a reboiler to accomplish the regeneration step.

24 Claims, 7 Drawing Sheets

(56) References Cited

U.S. PATENT DOCUMENTS

| | | | |
|---|---|---|---|
| 4,112,052 A | 9/1978 | Sartori et al. | |
| 4,240,922 A | 12/1980 | Sartori et al. | |
| 5,366,709 A | 11/1994 | Peytavy et al. | |
| 5,603,908 A * | 2/1997 | Yoshida et al. | 423/220 |
| 5,618,506 A * | 4/1997 | Suzuki et al. | 423/228 |
| 5,700,437 A | 12/1997 | Fujii et al. | |
| 5,736,115 A | 4/1998 | Iijima et al. | |
| 5,744,110 A | 4/1998 | Mimura et al. | |
| 5,904,908 A * | 5/1999 | Suzuki et al. | 423/228 |
| 6,036,931 A * | 3/2000 | Yoshida et al. | 423/228 |
| 6,051,161 A | 4/2000 | Suzuki et al. | |
| 6,500,397 B1 | 12/2002 | Yoshida et al. | |
| 6,582,498 B1 | 6/2003 | Sass et al. | |
| 6,689,332 B1 | 2/2004 | Yoshida et al. | |
| 7,056,482 B2 | 6/2006 | Hakka et al. | |
| 7,601,315 B2 | 10/2009 | Ouimet | |
| 7,758,673 B2 | 7/2010 | Brok et al. | |
| 8,070,856 B2 | 12/2011 | Rochelle et al. | |
| 8,197,857 B2 | 6/2012 | Dressler et al. | |
| 8,347,627 B2 | 1/2013 | Yamashita et al. | |
| 8,388,855 B2 | 3/2013 | Rochelle et al. | |
| 2001/0021362 A1* | 9/2001 | Ishida | 423/228 |
| 2007/0044658 A1 | 3/2007 | Rochelle et al. | |
| 2008/0025893 A1 | 1/2008 | Asprion et al. | |
| 2008/0098892 A1 | 5/2008 | Asprion et al. | |
| 2008/0236390 A1* | 10/2008 | Anders et al. | 95/183 |
| 2009/0101868 A1* | 4/2009 | Zhang et al. | 252/184 |
| 2009/0305388 A1 | 12/2009 | Dressler et al. | |
| 2010/0050637 A1 | 3/2010 | Yamashita et al. | |
| 2010/0172813 A1* | 7/2010 | Nazarko et al. | 423/232 |
| 2010/0192770 A1 | 8/2010 | Andarcia et al. | |
| 2011/0033359 A1* | 2/2011 | Papenheim et al. | 423/235 |
| 2011/0135549 A1* | 6/2011 | Lichtfers et al. | 423/228 |
| 2011/0182799 A1* | 7/2011 | Riman et al. | 423/396 |
| 2012/0043501 A1 | 2/2012 | Rochelle et al. | |
| 2012/0230896 A1* | 9/2012 | Wagner et al. | 423/229 |

FOREIGN PATENT DOCUMENTS

| | | |
|---|---|---|
| EP | 0776687 A1 | 6/1997 |
| EP | 0945162 A1 | 9/1999 |
| GB | 1593420 | 7/1981 |
| WO | 2004089512 A1 | 10/2004 |
| WO | 2010086449 A1 | 8/2010 |

OTHER PUBLICATIONS

F. Bougie and M.C. Iliuta, Kinetics of absorption of carbon dioxide into aqueous solutions of 2-amino-2 hydroxymethyl-1,3-propanediol, Chemical Engineering Science, vol. 64, Issue 1, Jan. 2009, pp. 153-162, Elsevier Ltd., Copyright 2008.

S. Paul, A.K. Ghoshal and B. Mandal, Absorption of Carbon Dioxide into Aqueous Solutions of 2-Piperidineethanol: Kinetics Analysis, Ind. Eng. Chem. Res., vol. 48, No. 3, Feb. 2009, pp. 1414-1419, American Chemical Society, Copyright 2009.

A. Samanta and S.S. Bandyopadhyay, Absorption of carbon dioxide into aqueous solutions of piperazine activated 2-amino-2-methyl-1-propanol, Chemical Engineering Science, vol. 64, Issue 6, Mar. 2009, pp. 1185-1194, Elsevier Ltd., Copyright 2008.

J.T. Cullinane and G.T. Rochelle, Kinetics of Carbon Dioxide Absorption into Aqueous Potassium Carbonate and Piperazine, Ind. Chem. Eng. Res., vol. 45, Issue 8, Apr. 2006, pp. 2531-2545, American Chemical Society, Copyright 2006.

B.A. Oyenekan and G.T. Rochelle, Rate modeling of $CO_2$ stripping from potassium carbonate promoted by piperazine, International Journal of Greenhouse Gas Control, vol. 3, Issue 2, Mar. 2009, pp. 121-132, Elsevier Ltd., Copyright 2008.

M.A. Pacheco, Mass Transfer, Kinetics and Rate-based Modeling of Reactive Absorption, Doctoral Thesis, The University of Texas at Austin, May 1998.

P.W.J. Derks, T. Kleingeld, C. van Aken, J.A. Hogendoorn and G.F. Versteeg, Kinetics of absorption of carbon dioxide in aqueous piperazine solutions, Chemical Engineering Science, vol. 61, Issue 20, Oct. 2006, pp. 6837-6854, Elsevier Ltd., Copyright 2006.

T. Hobler, Mass Transfer and Absorbers, International Series of Monographs in Chemical Engineering, Wydawnictwa Naukowo-Techniczne, Warsaw, Pergamon Press, London, pp. 127-143, Copyright 1966.

S. Bishnoi, Carbon Dioxide Absorption and Solution Equilibrium in Piperazine Activated Methyldiethanolamine, Doctoral Thesis, The University of Texas at Austin, Dec. 2000.

J. Gabrielsen, M.L. Michelsen, E.H. Stenby and G.M. Kontogeorgis, A Model for Estimating $CO_2$ Solubility in Aqueous Alkanolamines, Ind. Eng. Chem. Res., vol. 44, Issue 9, Apr. 2005, pp. 3348-3354, American Chemical Society, Copyright 2005.

J. Gabrielsen, M.L. Michelsen, E.H. Stenby and G.M. Kontogeorgis, Modeling of $CO_2$ Absorber Using an AMP Solution, AIChE Journal, vol. 52, No. 10, Oct. 2006, pp. 3443-3451, American Institute of Chemical Engineers, Copyright 2006.

L. Ji, S.J. Miksche, L.M. Rimpf and G.A. Farthing, $CO_2$ Chemical Solvent Screening, Technical Paper BR-1823, 8 pp., Presented at the 8th Annual Conference on Carbon Capture and Sequestration—DOE/NETL, Pittsburgh, Pennsylvania, U.S.A., May 4-7, 2009, Babcock & Wilcox Power Generation Group, Inc., Barberton, Ohio, U.S.A., Copyright 2009.

Extended European Search Report from EPO, Communication dated Aug. 6, 2011, Application No. 11159699.5-2113.

New Zealand Examination Report, dated Apr. 1, 2011, Patent Application No. 591946.

New Zealand Examination Report, dated Sep. 26, 2012, Patent Application No. 602566.

New Zealand Further Examination Report, dated Jun. 5, 2013, Patent Application No. 602566.

Canadian Office Action, dated Apr. 23, 2012, Patent Application No. 2,735,063.

Canadian Office Action, dated Jan. 3, 2013, Patent Application No. 2,735,063.

Canadian Office Action, dated Sep. 30, 2013, Patent Application No. 2,735,063.

New Zealand Examination Report dated Jan. 23, 2014 for corresponding New Zealand Patent Application No. 602566.

Chinese Office Action dated Mar. 25, 2014 for corresponding Chinese Patent Application No. 201110128323.5.

* cited by examiner

CHEMICAL COMPOUNDS FOR THE REMOVAL OF CARBON DIOXIDE FROM GASES

RELATED APPLICATION DATA

This patent application claims priority to U.S. Provisional Patent Application No. 61/318,044, filed Mar. 26, 2010, and titled "Chemical Solvents for the Removal of Carbon Dioxide from Flue Gases." The complete text of that application is hereby incorporated by reference as though fully set forth herein in its entirety.

FIELD AND BACKGROUND OF THE INVENTION

1. Field of the Invention

The present invention relates generally to the field of post-combustion carbon dioxide capture.

Government agencies, such as, for example, the United States Environmental Protection Agency, set specific limits to the amount of pollutants that can be released into the environment. These limits are referred to as emissions standards. Many emissions standards focus on regulating, among other things, pollutants released by industry, automobiles, power plants, as well as small equipment such as lawn mowers and diesel generators.

$CO_2$ chemical absorption with an amine-based compound and/or solution is a current technology for post-combustion carbon capture from coal-fired power plants. There are techniques available now for post-combustion $CO_2$ capture with amine-based absorption processes.

U.S. Pat. No. 6,036,931 to Yoshida et al. discloses a technique in which $CO_2$ can be separated from flue gases with a mixed aqueous solution of an amine X and a promoter Y. Amine X can be selected from a hindered amine 2-amino-2-methyl-1-propanol ("AMP") or from the group having one alcoholic hydroxyl group and a primary amino group in its molecule, where the primary amino group is bonded to a tertiary carbon atom having two unsubstituted alkyl groups.

U.S. Pat. No. 6,500,397 to Yoshida et al. discloses a similar technique described in U.S. Pat. No. 6,036,931. This reference discloses another technique for $CO_2$ removal from flue gases, which includes using 2-(methylamino)-ethanol or 2-ethylamino ethanol as $CO_2$ absorbents where the concentration of the absorbent is 25 to 65 percent by weight.

U.S. Pat. No. 6,051,161 to Suzuki discloses a technique in which a mixed aqueous amine solution is selected to contact with flue gas to separate $CO_2$. The concept is very similar to those already discussed above. Examples of amines to be promoted are diethylaminoacetamide, 2-butylamino acetamide, and 2-dimethylamino-N,N-dimethylacetamide. U.S. Pat. No. 5,904,908 to Suzuki et al. discloses almost the same concept regarding $CO_2$ capture compound selection.

U.S. Pat. No. 5,366,709 to Peytavy et al. discloses a technique wherein butylmonoethanolamine activated tertiary alkanolamine was used as a liquid solution for $CO_2$ removal. It is asserted therein that using this solution improved $CO_2$ absorption capacity.

U.S. Pat. No. 4,112,051 to Sartori et al. discloses a method for removing $CO_2$ from gaseous mixtures where an amine-based liquid absorbent was proposed. The amine-based solution is a physical absorbent for $CO_2$ and the amine is a sterically hindered amine.

The above processes are limited due to inefficiencies and other limitations inherent therein in the removal of $CO_2$ from flue gases.

A need remains for an efficient method and apparatus for the removal of $CO_2$ from flue gases.

SUMMARY OF THE INVENTION

The prior art related to $CO_2$ absorbents primarily focuses on improving absorption rates of various amines, such as tertiary amines and some hindered amines, which have relatively large $CO_2$ absorption capacity and smaller heat of reaction. Mixing various activators and tertiary or hindered amines is one approach.

Embodiments of the present invention include a system and method for the use of 2-(2-hydroxyethyl)-piperidine ("2-PE") or 2-PE mixed with one or more additional promoter compounds that are then placed into an aqueous solution and utilized as a $CO_2$ absorption solution for post-combustion flue gas carbon capture. 2-PE is advantageous for this purpose due to its unique characteristics, such as high absorption rate and high absorption capacity.

In the amine-based post-combustion $CO_2$ capture processes according to embodiments of the present invention, the parasitic energy loss mostly comes from the regeneration energy required for the regeneration of the one or more amine compounds that are contained in the absorption solution. More specifically, the regeneration energy consists of three different parts: sensible heat, which is the energy required to heat the $CO_2$-laden solution to the temperature of a stripper; heat to reverse the reaction, which is related to the heat of reaction of a specific amine; and stripping steam, which is the steam needed to provide the driving force to strip free $CO_2$ out of the solution.

Higher $CO_2$ working capacity will reduce the circulation rates of the absorption solution between absorber and stripper, which will directly minimize the sensible heat requirement. For tertiary or some hindered amines bicarbonate is the dominant species in solution and has a much smaller heat of reaction compared to that for carbamate formation, which is often the dominant species when using a primary or secondary amine (here the word "primary" refers to the type of amine utilized and does not encompass the definition for "primary" discussed below) as the amine-base absorption compound in a $CO_2$ absorption solution. The higher the percentage of bicarbonate species in the solution, the less energy is expected to be required to reverse the reaction to release $CO_2$. As for $CO_2$ absorption rate, the faster the rate, the quicker the reaction will reach its equilibrium state, the shorter the absorber will be, which will reduce costs accordingly.

Embodiments of the present invention provide an aqueous solution-based $CO_2$ chemical absorber having, or needing, a minimal energy requirement in the stripper (which could also be referred to as a regenerator) while maintaining a reasonable reaction rate in the absorber. One advantage is a reduced capital cost for the absorber.

One aspect of the present invention is drawn to an improved method and apparatus for utilizing an amine-based solution for flue gas $CO_2$ capture.

Accordingly, one aspect of the present invention is drawn to a method for post-combustion $CO_2$ capture comprising: (i) introducing an aqueous solution containing an amine-based absorption compound to an absorber, the absorber being located downstream of a flue gas scrubber; (ii) delivering a $CO_2$-containing gas from the flue gas scrubber to the absorber to form a $CO_2$-laden amine-based absorption compound; and (iii) subjecting the $CO_2$-laden amine-based absorption compound to a regeneration step for regenerating the $CO_2$-laden amine-based absorption compound and stripping out $CO_2$ from the $CO_2$-laden amine-based absorption compound, wherein energy is supplied to a stripper to accomplish the regeneration step.

Accordingly, another aspect of the present invention is drawn to a method for post-combustion $CO_2$ capture comprising: (I) introducing an aqueous solution containing an amine-based absorption compound to an absorber, the absorber being located downstream of a flue gas scrubber; (II) delivering a $CO_2$-containing gas from the flue gas scrubber to the absorber to form a $CO_2$-laden amine-based absorption compound; and (III) subjecting the $CO_2$-laden amine-based absorption compound to a regeneration step for regenerating the $CO_2$-laden amine-based absorption compound and stripping out $CO_2$ from the $CO_2$-laden amine-based absorption compound, wherein energy is supplied to a stripper to accomplish the regeneration step and wherein the amine-based absorption compound is 2-(2-hydroxyethyl)-piperidine.

Accordingly, still another aspect of the present invention is drawn to a method for post-combustion $CO_2$ capture comprising: (a) introducing an aqueous solution containing an amine-based absorption compound to an absorber, the absorber being located downstream of, or independently from, a combustion process that generates combustion gases $CO_2$; (b) delivering a $CO_2$-containing gas to the absorber to form a $CO_2$-laden amine-based absorption compound; and (c) subjecting the $CO_2$-laden amine-based absorption compound to a regeneration step for regenerating the $CO_2$-laden amine-based absorption compound and stripping out $CO_2$ from the $CO_2$-laden amine-based absorption compound, wherein energy is supplied to a stripper to accomplish the regeneration step.

Accordingly, still another aspect of the present invention is drawn to an apparatus for post-combustion $CO_2$ capture comprising: at least one absorber, the at least one absorber containing an amine-based aqueous absorption solution (or one or more amine-based absorption compounds) in the absorber, wherein the at least one absorber is located downstream of a wet, or dry, flue gas scrubber; at least one means for delivering $CO_2$ from the wet, or dry, flue gas scrubber to the absorber to form a $CO_2$-laden amine-based aqueous absorption solution (or one or more amine-based absorption compounds); at least one stripper means for accomplishing the regeneration of the $CO_2$-laden amine-based aqueous absorption solution (or one or more amine-based absorption compounds) in order to regenerate the $CO_2$-laden amine-based aqueous absorption solution (or one or more amine-based absorption compounds) while stripping out $CO_2$ from the $CO_2$-laden amine-based aqueous absorption solution (or one or more amine-based absorption compounds); and at least one reboiler, the reboiler designed to supply energy to the stripper means in order to facilitate the regeneration of the $CO_2$-laden amine-based aqueous absorption solution (or one or more amine-based absorption compounds).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE INVENTION

Figure 1:
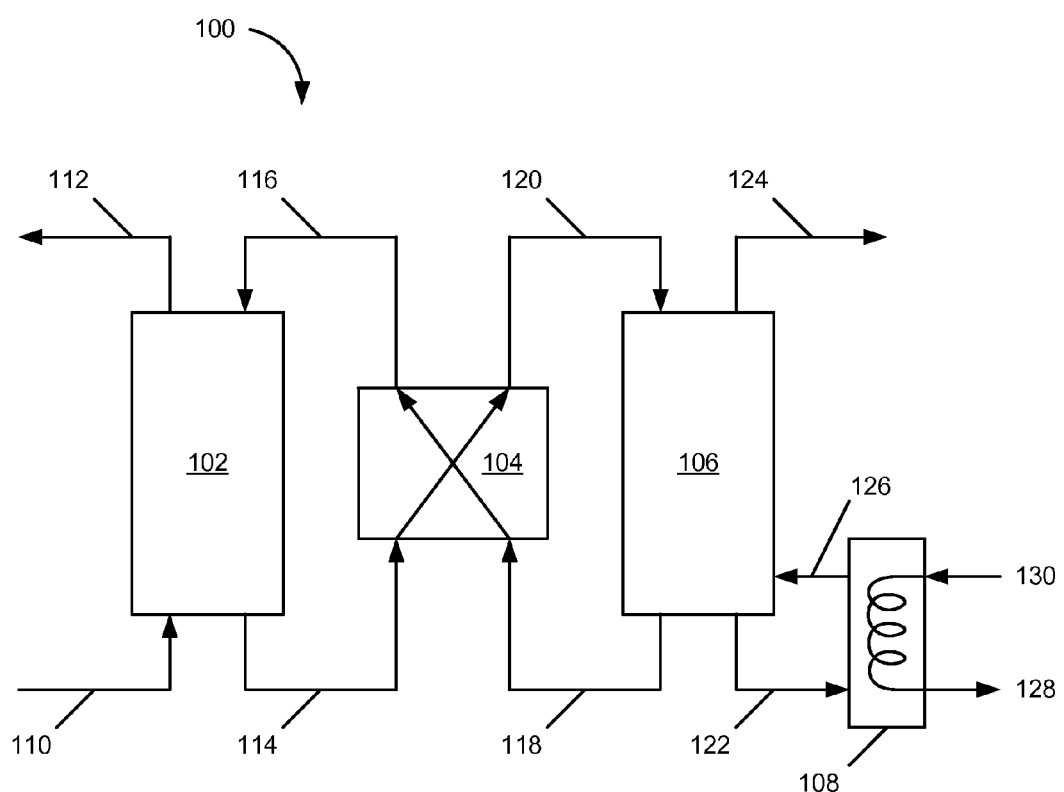
FIG. 1 illustrates a flow diagram of a method and apparatus according to one embodiment of the present invention.

Referring now to the drawings, wherein like references designate the same or functionally similar elements throughout the several drawings, FIG. 1 illustrates a flow diagram of a method and apparatus according the one embodiment of the present invention for utilizing an amine-containing aqueous-based solution for flue gas $CO_2$ capture. In $CO_2$-capture apparatus 100 of FIG. 1, apparatus 100 comprises a $CO_2$ absorber section 102, a heat exchanger section 104, a $CO_2$ stripper section 106 and a reboiler section 108. Components 102, 104, 106 and 108 of apparatus 100 are interconnected as illustrated in FIG. 1 and as will be detailed herein. Regarding $CO_2$ absorber section 102, this section contains at least one $CO_2$ absorber that contains therein an amine-based absorption compound according to any of the embodiments of the present invention that are detailed below. Regarding heat exchanger section 104, heat exchanger section 104 is comprised of one or more heat exchangers designed to transfer heat from one process flow to another process flow. Suitable heat exchangers for use in the present invention are known to those of skill in the art and, as such, a detailed discussion is omitted herein for the sake of brevity. Regarding $CO_2$ stripper section 106, $CO_2$ stripper section 106 is comprised of one or more devices designed to remove and capture $CO_2$ gas from a $CO_2$-laden amine-based absorption compound and provide the so-captured $CO_2$ gas to either be sequestered or utilized in any suitable manner. Suitable $CO_2$ stripper devices are known to those of skill in the art and, as such, a detailed discussion is omitted herein for the sake of brevity. Regarding reboiler section 108, reboiler section 108 is designed to utilize heat, waste heat, or turbine extraction steam to provide energy to the one or more $CO_2$ stripper devices contained in $CO_2$ stripper section 106. Suitable reboilers are known to those of skill in the art and, as such, a detailed discussion is omitted herein for the sake of brevity.

Regarding apparatus 100, $CO_2$-containing combustion gases, $CO_2$-containing flue gases, or a $CO_2$-containing gas (this could also be referred to interchangeably as a $CO_2$-laden gas) is supplied to $CO_2$ absorber section 102 via any suitable supply means 110. Due to the apparatus and method of the present invention as described herein, some, or all, of the $CO_2$ in $CO_2$-containing combustion gases, $CO_2$-containing flue gases, or a $CO_2$-containing gas is removed thereby enabling the $CO_2$ absorber section 102 to output "cleaned" combustion gas, "cleaned" flue gas, or a "cleaned" gas via a suitable output supply means. As shown in FIG. 1, cold $CO_2$-laden solution is supplied to one input side of heat exchanger section 104 via supply means 114 where the cold $CO_2$-laden solution absorbs heat from the other side of heat exchanger section 104. The other side of heat exchanger section 104 receives hot $CO_2$-depleted solution via supply means 118 from $CO_2$ stripper section 106 and transfers it heat to the cold $CO_2$-laden solution as noted above. The now cold $CO_2$-depleted solution is then supplied to $CO_2$ absorber section 102 via supply means 116 so that $CO_2$ absorber section 102 has a supply of $CO_2$-depleted solution that contains an amine-containing aqueous-based solution in accordance with the various embodiments of the present invention and is suitable for beginning the $CO_2$ capture process of the present invention. As used herein, the terms "laden" and "depleted" are relative terms and do not confer any specific concentration level of $CO_2$ in a given medium other than a "$CO_2$-laden medium/solution" in the context of the present invention will contain more, or even just slightly more, $CO_2$ than a "$CO_2$-deplete medium/solution."

Once the cold $CO_2$-laden solution absorbs heat in heat exchanger section 104 it is now a hot $CO_2$-laden solution and is supplied via supply means 120 to $CO_2$ stripper section 106. It is in $CO_2$ stripper section 106 where $CO_2$ is stripped from the hot $CO_2$-laden solution thereby yielding a $CO_2$-depleted solution that is returned to heat exchanger section 104 via supply means 118 as discussed above. The $CO_2$ so stripped is then supplied via supply means 124 to any suitable container or sequestration system. Suitable containers or sequestration systems are known in the art and, as such, a detailed discussion herein is omitted for the sake of brevity. As shown in system 100, $CO_2$ stripper section 106 receives operational energy from heat, waste heat, or turbine extraction steam via reboiler section 108 which has a hot side input 130 and a hot side output supply means 126 that supplies energy and/or heat to $CO_2$ stripper section 106 and a cold return input supply means 122 and a cold side output 128 for supplying the operational energy depleted carrier back from where it came.

Figure 2:
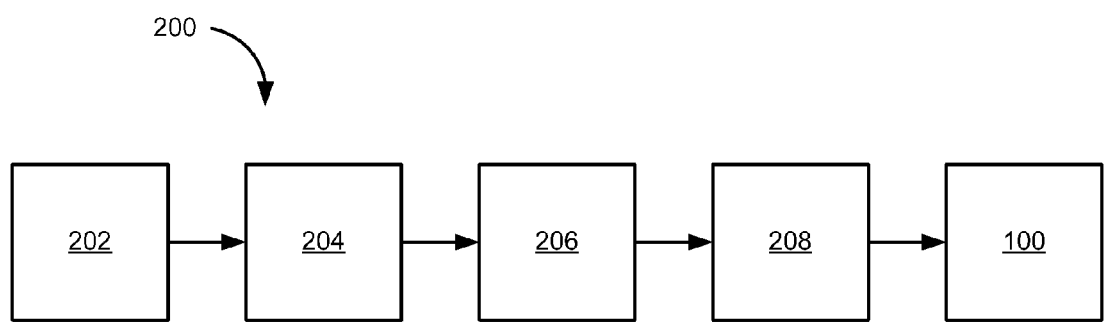
FIG. 2 illustrates a flow diagram of one type of a system that generates combustion gases that contain $CO_2$ that can be subjected to $CO_2$ capture according to the present invention.

Turning to FIG. 2, FIG. 2 illustrates a flow diagram of one possible combustion-based/fossil fuel-based system 200 to which system 100 can be utilized to capture some, or all, of the $CO_2$ generated during a combustion process. In system 200, section 202 represents a fossil fuel, biomass, black liquor, or any other type of boiler that generates heat via any type of combustion process. A wide range of boilers that utilize a wide range of combustible fuels are known in the art and the present invention is intended to encompass any type of combustion process that generates $CO_2$ during its operation. Since such processes are known to those of skill in the art, a detailed discussion herein is omitted for the sake of brevity.

When system 200 is a fossil fuel boiler as illustrated in FIG. 2, boiler section 202 is operatively coupled to a Selective Catalytic Reduction (SCR) section 204 that is designed to mitigate and/or reduce any $NO_x$ that is generated during the combustion process. Such SCR devices are known to those of skill in the art and, as such, a detailed discussion is omitted herein for the sake of brevity. In system 200 of FIG. 2 SCR section 204 is operatively coupled to a particulate collection section 206. Particulate collection section 206 can be selected from electrostatic precipitators or particulate filters as known to those of skill in the art. Particulate collection section 206 is operatively coupled to a flue gas desulfurization section 208 which is designed to remove $SO_x$ from the flue and/or combustion gases. As known to those of skill in the art, flue gas desulfurization section 208 can be selected from any suitable known wet or dry flue gas desulfurization device. Finally, $CO_2$-capture apparatus 100 (shown simply as section 100 for ease of reference) of FIG. 1 is operatively coupled to the output side of flue gas desulfurization section 208.

Figure 3:
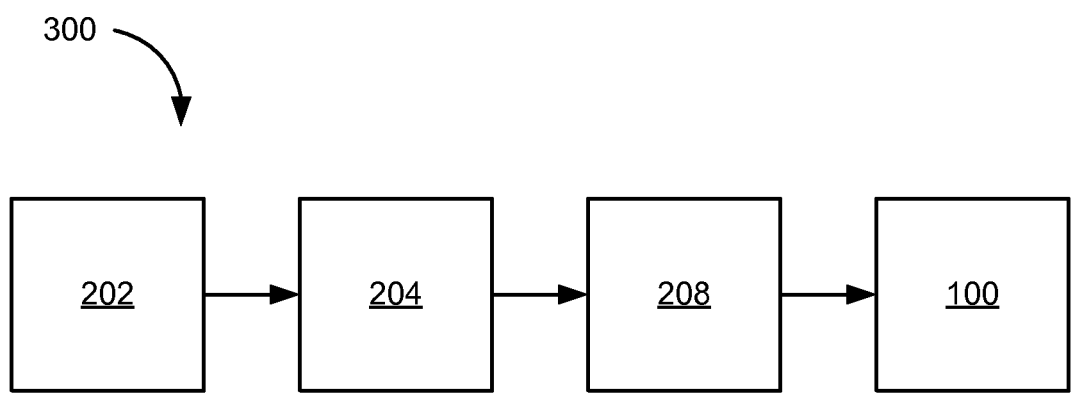
FIG. 3 illustrates a flow diagram of another type of a system that generates combustion gases that contain $CO_2$ that can be subjected to $CO_2$ capture utilizing a $CO_2$ capture system according to one embodiment of the present invention.

Turning to FIG. 3, FIG. 3 illustrates a flow diagram of another possible combustion-based/fossil fuel-based system 300 to which $CO_2$-capture apparatus 100 can be utilized to capture some, or all, of the $CO_2$ generated during a combustion process. System 300 is identical to system 200 of FIG. 2 except that particulate collection section 206 located between SCR section 204 and flue gas desulfurization section 208 has been eliminated. As illustrated in FIG. 3, section 100 is a simplified representation of $CO_2$-capture apparatus 100 of FIG. 1.

Figure 4:
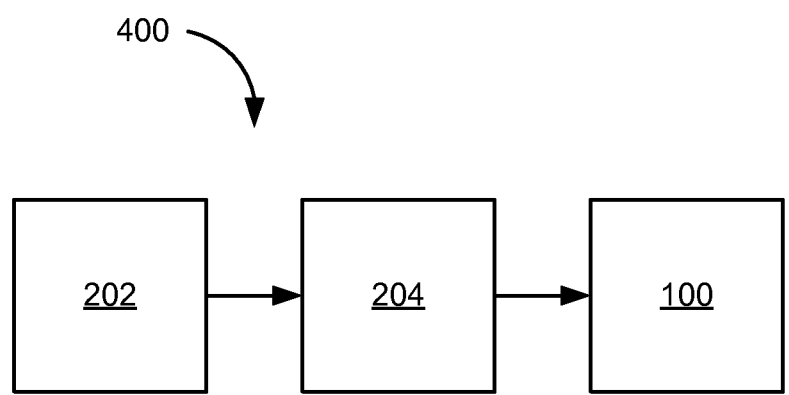
FIG. 4 illustrates a flow diagram of still another type of a system that generates combustion gases that contain $CO_2$ that can be subjected to $CO_2$ capture utilizing a $CO_2$ capture system according to one embodiment of the present invention.

Turning to FIG. 4, FIG. 4 illustrates a flow diagram of still another possible combustion-based/fossil fuel-based system 400 to which $CO_2$-capture apparatus 100 can be utilized to capture some, or all, of the $CO_2$ generated during a combustion process. System 400 is identical to system 200 of FIG. 2 except that particulate collection section 206 and flue gas desulfurization section 208 have been eliminated and $CO_2$-capture apparatus 100 is operatively coupled to SCR section 204. As illustrated in FIG. 4, section 100 is a simplified representation of $CO_2$-capture apparatus 100 of FIG. 1.

Figure 5:
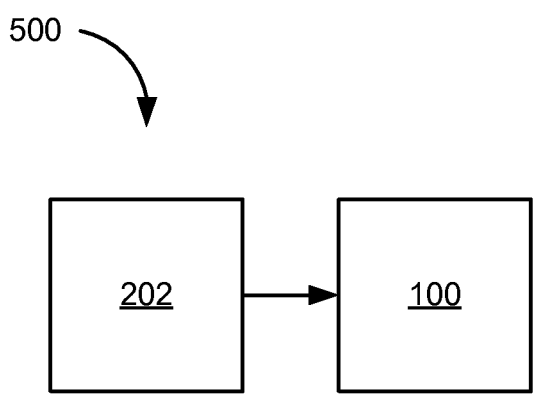
FIG. 5 illustrates a flow diagram of still another type of a system that generates combustion gases that contain $CO_2$ that can be subjected to $CO_2$ capture utilizing a $CO_2$ capture system according to one embodiment of the present invention.

Turning to FIG. 5, FIG. 5 illustrates a flow diagram of still another possible combustion-based/fossil fuel-based system 500 to which $CO_2$-capture apparatus 100 can be utilized to capture some, or all, of the $CO_2$ generated during a combustion process. System 500 is identical to system 200 of FIG. 2 except that SCR section 204, particulate collection section 206 and flue gas desulfurization section 208 have all been eliminated and $CO_2$-capture apparatus 100 is operatively coupled directly to any combustion or boiler section 202. As illustrated in FIG. 5, section 100 is a simplified representation of $CO_2$-capture apparatus 100 of FIG. 1.

Regarding the systems of FIGS. 2 through 5, various other known emissions control devices and/or systems can be connected at any suitable points in such systems as is known to those of skill in the art even though such emissions control devices and/or systems are not specifically illustrated. Accordingly, systems 200, 300, 400 and 500 of the present invention are to be broadly construed. Given this, system 100 of the present invention is not solely limited to utilization with systems 200, 300, 400 and/or 500 of the present invention.

As used herein, suitable supply means for use in conjunction with the present invention independently include, but are not limited to, flues, conduits, piping, duct work, or any suitable manner for transporting gases and/or liquids. Such additional suitable means for transporting gases are known in the art and, as such, a detailed discussion herein is omitted for the sake of brevity.

Given the above, in one embodiment $CO_2$ is delivered from a wet, or dry, flue gas scrubber to an absorber. In one embodiment, an amine-based absorption compound (as defined below) is introduced in an aqueous solution to the absorber, which is located downstream of the wet, or dry, flue gas scrubber to form an amine-containing aqueous-based solution. In one embodiment, the $CO_2$-laden amine-containing aqueous-based solution is then subjected to a regeneration step to regenerate the $CO_2$-laden amine-based absorption compound and strip out absorbed $CO_2$. In one embodiment, energy is supplied to a stripper through a reboiler to accomplish the regeneration step.

In one embodiment, the amine-based absorption compound is in an aqueous solution having a concentration of the amine-based absorption compound in the range of about 10 weight percent to about 95 weight percent, or from about 15 weight percent to about 90 weight percent, or from about 20 weight percent to about 85 weight percent, or from about 25 weight percent to about 80 weight percent, or from about 30 weight percent to about 75 weight percent, or from about 35 weight percent to about 70 weight percent, or from about 40 weight percent to about 65 weight percent, or even from about 45 weight percent to about 55 weight percent, based on the total weight of the aqueous solution. Here, as well as elsewhere in the specification and claims, individual numerical values, or limits, from one or more embodiments and/or ranges can be combined to form additional non-disclosed and/or non-stated ranges.

In one embodiment, the amine-based absorption compound is formed from only one primary amine-based absorption compound which is the primary and/or sole chemical compound that acts to absorb $CO_2$. In this embodiment, the amine-based absorption compound is formed from only 2-(2-hydroxyethyl)-piperidine (which is also referred to as 2-PE) which is utilized at amount as defined above. As used herein in the specification and claims, the phrase "primary amine-based absorption compound" means that the amine-based compound being referred to as the "primary amine-based absorption compound" is the main, or sole, amine-based absorption compound of the present invention. The word "primary" when utilized in conjunction with the words "amine-based absorption compound" does not, in the case of the present invention, refer to the nature of the amine portion of any amine compound referred to herein. In other words, the word "primary" is not being used to refer to the number of substituent groups attached to a nitrogen atom in place of one or more hydrogen atoms in the vein of a primary, secondary or tertiary amine. Rather, as noted above, the phrase "primary amine-based absorption compound" means that the amine-based compound being referred to as the "primary amine-based absorption compound" is the main, or sole, amine-based absorption compound of the present invention. Given the above, the reason that the phrase "primary amine-based absorption compound" is utilized herein is because, in some embodiments, there are two or more amine-based absorption compounds that are utilized in connection with the present invention. In this case the absorption compound that is present in the major amount (i.e., an amount of at least 50.1 weight percent based on the total amount of amine compounds utilized) is termed the "primary amine-based absorption compound" while the one or more amine-based absorption compounds that are present in a minor amount (i.e., an amount of no more than 49.9 weight percent based on the total amount of amine compounds utilized) are termed the one or more amine-based promoter compounds.

In another embodiment, the amine-based absorption compound of the present invention is a combination of a primary amine-based absorption compound and one or more amine-based promoter compounds. In these such embodiments, the primary amine-based absorption compound is 2-(2-hydroxyethyl)-piperidine (which is also referred to as 2-PE) while the one or more amine-based promoter compounds are selected from one or more of monoethanolamine ("MEA"), piperazine ("PZ"), 2-(1-piperazinyl)-ethylamine ("PZEA"), 1-methylpiperazine, 2-methylpiperazine, 3-methylaminopropylamine ("MAPA"), morpholine, piperidine, or suitable combinations of two or more thereof.

Thus, given the above, in one embodiment, the amine-based absorption compound is an aqueous solution, having a concentration within a range defined above, of monoethanolamine ("MEA") and 2-PE. In another embodiment, the amine-based absorption compound is an aqueous solution, having a concentration within a range defined above, of piperazine ("PZ") and 2-PE. In still another embodiment, the amine-based absorption compound is an aqueous solution, having a concentration within a range defined above, of 2-(1-piperazinyl)-ethylamine ("PZEA") and 2-PE. In still another embodiment, the amine-based absorption compound is an aqueous solution, having a concentration within a range defined above, of 1-methylpiperazine and 2-PE. In still another embodiment, the amine-based absorption compound is an aqueous solution, having a concentration within a range defined above, of 2-methylpiperazine and 2-PE. In still another embodiment, the amine-based absorption compound is an aqueous solution, having a concentration within a range defined above, of 3-methylaminopropylamine ("MAPA") and 2-PE. In still another embodiment, the amine-based absorption compound is an aqueous solution, having a concentration within a range defined above, of morpholine and 2-PE. In still another embodiment, the amine-based absorption compound is an aqueous solution, having a concentration within a range defined above, of piperidine and 2-PE.

In still another embodiment, the amine-based absorption compound is an aqueous solution, having a concentration within a range defined above, of 2-PE in combination with one or more amine compounds selected from monoethanolamine ("MEA"), piperazine ("PZ"), 2-(1-piperazinyl)-ethylamine ("PZEA"), 1-methylpiperazine, 2-methylpiperazine, 3-methylaminopropylamine ("MAPA"), morpholine, piperidine, or suitable combinations of two or more thereof.

Figure 6:
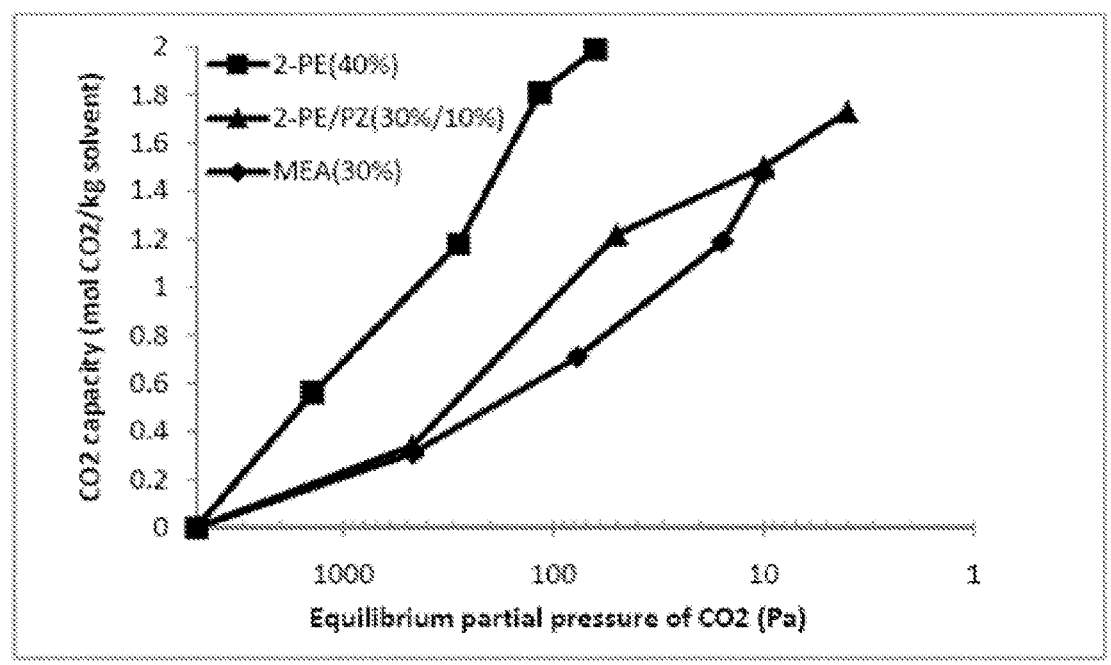
FIG. 6 is a graph showing $CO_2$ capacity with regard to equilibrium partial pressure data for 30 weight percent MEA, 40 weight percent 2-PE, and 2-PE/PZ (30 weight percent/10 weight percent) at 40° C.

FIG. 6 shows $CO_2$ capacity for 30 weight percent MEA, 40 weight percent 2-PE, and 2-PE/PZ (30 weight percent/10 weight percent) based on their corresponded vapor-liquid equilibrium data at 40° C. As can be seen, $CO_2$ capacity for 2-PE and 2-PE/PZ are consistently higher than that of MEA, under similar experimental conditions.

Figure 7:
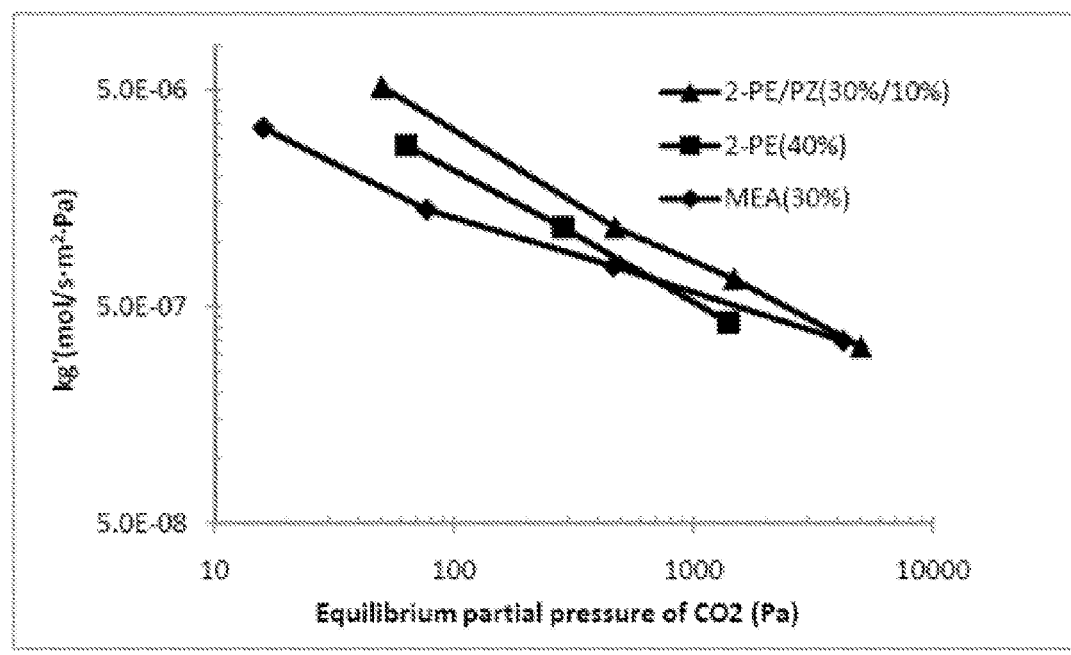
FIG. 7 is a graph showing $CO_2$ absorption rate data for 30 weight percent MEA, 40 weight percent 2-PE, and 2-PE/PZ (30 weight percent/10 weight percent) at 40° C.

With reference to FIG. 7, the comparison of $k_g'$, which is a measure of reaction rate in the liquid, for MEA, 2-PE, and 2-PE/PZ is provided. The $k_g'$ for 2-PE is comparable to that of MEA under the lean $CO_2$ loading conditions while slightly smaller than that of MEA under the rich $CO_2$ loading conditions. Given this, 2-PE/PZ shows consistently higher $k_g'$ than that of MEA under all $CO_2$ loading conditions.

In developing the present invention, it was found that 2-PE, a hindered amine, is a promising chemical compound for post-combustion $CO_2$ capture alone or in combination with one or more amine-based promoter compounds. Given this, 2-PE has a theoretical $CO_2$ capacity of 1 mole per mole of 2-PE since only bicarbonate will be formed. The heat of absorption is lower than that of MEA, as indicated in Table 1.

Preliminary analysis for regeneration energy requirement for different compounds, or combination of compounds, are performed and the results are listed in Table 1, below, which shows regeneration energy break-down: heat of absorption ($\Delta H_{abs}$), sensible heat, and stripping heat for 30 weight percent MEA, 40 weight percent 2-PE, and 2-PE/PZ (30 weight percent/10 weight percent) under their typical operation rich and lean $CO_2$ loading conditions.

TABLE 1

| Compound | Concentration (wt %) | Heat of absorption $\Delta H_{abs}$ (kJ/mol) | Sensible heat (kJ/mol) | Stripping heat (kJ/mol) | Rich/Lean Loading (mol/ $mol_{alk}$) |
|---|---|---|---|---|---|
| MEA | 30 | 82 | 29.8 | 70.9 | 0.50/0.25 |
| 2-PE | 40 | 64 | 14.5 | 59.9 | 0.74/0.10 |
| 2-PE/PZ | 30/10 | 63 | 15.5 | 49.9 | 0.48/0.10 |

Each part of the regeneration energy of 2-PE and 2-PE/PZ is significantly lower than that of MEA, which indicates the substantially lower energy consumption during the $CO_2$-laden amine compound regeneration step.

The embodiments of the present invention use either single 2-PE aqueous solution as a compound to remove $CO_2$ from flue gases under atmospheric pressure with $CO_2$ partial pressure less than 20,000 Pa, or a mixed aqueous solution of 2-PE and at least one promoter which is selected from one or more of MEA, PZ and its derivative, 1-methylpiperazine, 2-methylpiperazine, PZEA, MAPA, morpholine, piperidine, or suitable combinations of two or more thereof. As noted above, the total amount of the amine-based absorption compound (which is either a primary amine-based absorption compound alone, or the combination of a primary amine-based absorption compound and the one or more amine-based promoter compounds) is in the range of about 10 weight percent to about 95 weight percent, or from about 15 weight percent to about 90 weight percent, or from about 20 weight percent to about 85 weight percent, or from about 25 weight percent to about 80 weight percent, or from about 30 weight percent to about 75 weight percent, or from about 35 weight percent to about 70 weight percent, or from about 40 weight percent to about 65 weight percent, or even from about 45 weight percent to about 55 weight percent, based on the total weight of the aqueous solution. Here, as well as elsewhere in the specification and claims, individual numerical values, or limits, from one or more embodiments and/or ranges can be combined to form additional non-disclosed and/or non-stated ranges.

In the one or more embodiments, where the one or more amine-based promoter compounds are present in the amine-based absorption compound of the present invention, the concentration of the one or more amine-based promoter compounds are in the range of about 0.5 weight percent to about 30 weight percent, or from about 1 weight percent to about 27.5 weight percent, or from about 2.5 weight percent to about 25 weight percent, or from about 5 weight percent to about 22.5 weight percent, or from about 7.5 weight percent to about 20 weight percent, or from about 10 weight percent to about 17.5 weight percent, or even from about 12.5 weight percent to about 15 weight percent, based on the total amount of the amine-based absorption and promoter compounds that form the overall amine-based absorption compounds of the present invention. Here, as well as elsewhere in the specification and claims, individual numerical values, or limits, from one or more embodiments and/or ranges can be combined to form additional non-disclosed and/or non-stated ranges. In another embodiment, one or more optional corrosion and/or degradation inhibitors can be added to the aqueous-based solutions of the present invention that contain one or more amine-based absorption compounds described herein. Such one or more optional corrosion and/or degradation inhibitors are known to those of skill in art and as such, a detailed discussion herein is omitted for the sake of brevity.

Embodiments of the present invention provide a number of advantages over what is currently known in the field. It is expected that this invention will result in effective $CO_2$ removal from flue gases with a reduced parasitic energy loss, compared to current state-of-the-art post combustion $CO_2$ capture technology.

While not wishing to be bound to any one theory, it is believed that 2-PE promoted by a certain amount of promoter, such as MEA or PZ, can further increase the $CO_2$ absorption rate thereby resulting in an even lower capital cost associated with the absorber.

One of the unique characteristics of 2-PE is its relatively fast absorption rate, which will require less packing height in the absorber for achieving a certain $CO_2$ absorption loading. This will reduce capital costs. Another advantage of using 2-PE is its relatively high $CO_2$ absorption capacity, which will reduce the flow rate of the aqueous amine-based solution and consequently reduce the regeneration energy requirement.

As would be appreciated by those of skill in the art, the present invention is not solely limited to just those embodiments where it is utilized in connection with a wet, or dry, flue gas scrubber. Rather, the present invention is broadly applicable to $CO_2$ capture in connection with the combustion of any fossil fuel or other suitable fuel (e.g., coal, oil, natural gas, re-captured methane, biomass, refuse-derived fuels, delayed petroleum coke, black liquor, etc.) and for systems having various configurations and types of particulate, nitrous oxides and sulfur oxides removal equipment for treating combustion gases containing $CO_2$. As such, the present invention should be broadly construed to be applicable to any industrial process where it may be desirable to capture some, or all, of the $CO_2$ produced in connection with any type of combustion.

While specific embodiments of the invention have been shown and described in detail to illustrate the application of the principles of the invention, it will be understood that the invention may be embodied otherwise without departing from such principles.

What is claimed is:

1. A method for post-combustion $CO_2$ capture comprising:
   (i) introducing an aqueous solution containing an amine-based absorption compound to an absorber, the absorber being located downstream of a flue gas scrubber;
   (ii) delivering a $CO_2$-containing gas from the flue gas scrubber to the absorber to form a $CO_2$-laden amine-based absorption compound; and
   (iii) subjecting the $CO_2$-laden amine-based absorption compound to a regeneration step for regenerating the $CO_2$-laden amine-based absorption compound and stripping out $CO_2$ from the $CO_2$-laden amine-based absorption compound, wherein energy is supplied to a stripper to accomplish the regeneration step, and
   wherein the amine-based absorption compound is a combination of a primary amine-based compound selected from 2-(2-hydroxyethyl)-piperidine and one or more different amine-based promoter compounds selected from monoethanolamine, piperazine, 2-(1-piperazinyl)-ethylamine, 1-methylpiperazine, 2-methylpiperazine, 3-methylaminopropylamine, morpholine, piperidine, or suitable combinations of any two or more thereof.

2. The method of claim 1, wherein the amine-based absorption compound is in an aqueous solution having a concentration in the range of about 10 weight percent to about 95 weight percent, based on the total weight of the aqueous solution.

3. The method of claim 1, wherein the amine-based absorption compound is in an aqueous solution having a concentration in the range of about 15 weight percent to about 90 weight percent, based on the total weight of the aqueous solution.

4. The method of claim 1, wherein the amine-based absorption compound is in an aqueous solution having a concentration in the range of about 20 weight percent to about 85 weight percent, based on the total weight of the aqueous solution.

5. The method of claim 1, wherein the amine-based absorption compound is an aqueous solution that contains from about 0.5 weight percent to about 30 weight percent of the one or more amine-based promoter compounds, based on the total amount of the amine-based compounds that form the overall amine-based absorption compound.

6. The method of claim 1, wherein the amine-based absorption compound is an aqueous solution that contains from about 1 weight percent to about 27.5 weight percent of the one or more amine-based promoter compounds, based on the total amount of the amine-based compounds that form the overall amine-based absorption compound.

7. The method of claim 1, wherein the amine-based absorption compound is an aqueous solution that contains from about 2.5 weight percent to about 25 weight percent of the one or more amine-based promoter compounds, based on the total amount of the amine-based compounds that form the overall amine-based absorption compound.

8. The method of claim 1, wherein the amine-based absorption compound is an aqueous solution that contains from about 5 weight percent to about 22.5 weight percent of the one or more amine-based promoter compounds, based on the total amount of the amine-based compounds that form the overall amine-based absorption compound.

9. A method for $CO_2$ capture comprising:
(a) introducing an aqueous solution containing an amine-based absorption compound to an absorber, the absorber being located downstream of, or independently from, a combustion process that generates combustion gases $CO_2$;
(b) delivering a $CO_2$-containing gas to the absorber to form a $CO_2$-laden amine-based absorption compound; and
(c) subjecting the $CO_2$-laden amine-based absorption compound to a regeneration step for regenerating the $CO_2$-laden amine-based absorption compound and stripping out $CO_2$ from the $CO_2$-laden amine-based absorption compound, wherein energy is supplied to a stripper to accomplish the regeneration step, and
wherein the amine-based absorption compound is a combination of a primary amine-based compound selected from 2-(2-hydroxyethyl)-piperidine and one or more different amine-based promoter compounds selected from monoethanolamine, piperazine, 2-(1-piperazinyl)-ethylamine, 1-methylpiperazine, 2-methylpiperazine, 3-methylaminopropylamine, morpholine, piperidine, or suitable combinations of any two or more thereof.

10. The method of claim 9, wherein the amine-based absorption compound is in an aqueous solution having a concentration in the range of about 10 weight percent to about 95 weight percent, based on the total weight of the aqueous solution.

11. The method of claim 9, wherein the amine-based absorption compound is in an aqueous solution having a concentration in the range of about 15 weight percent to about 90 weight percent, based on the total weight of the aqueous solution.

12. The method of claim 9, wherein the amine-based absorption compound is in an aqueous solution having a concentration in the range of about 20 weight percent to about 85 weight percent, based on the total weight of the aqueous solution.

13. The method of claim 9, wherein the amine-based absorption compound is an aqueous solution that contains from about 0.5 weight percent to about 30 weight percent of the one or more amine-based promoter compounds, based on the total amount of the amine-based compounds that form the overall amine-based absorption compound.

14. The method of claim 9, wherein the amine-based absorption compound is an aqueous solution that contains from about 1 weight percent to about 27.5 weight percent of the one or more amine-based promoter compounds, based on the total amount of the amine-based compounds that form the overall amine-based absorption compound.

15. The method of claim 9, wherein the amine-based absorption compound is an aqueous solution that contains from about 2.5 weight percent to about 25 weight percent of the one or more amine-based promoter compounds, based on the total amount of the amine-based compounds that form the overall amine-based absorption compound.

16. The method of claim 9, wherein the amine-based absorption compound is an aqueous solution that contains from about 5 weight percent to about 22.5 weight percent of the one or more amine-based promoter compounds, based on the total amount of the amine-based compounds that form the overall amine-based absorption compound.

17. A method for post-combustion $CO_2$ capture comprising:
(i) introducing an aqueous solution containing an amine-based absorption compound to an absorber, the absorber being located downstream of a flue gas scrubber;
(ii) delivering a $CO_2$-containing gas from the flue gas scrubber to the absorber to form a $CO_2$-laden amine-based absorption compound; and
(iii) subjecting the $CO_2$-laden amine-based absorption compound to a regeneration step for regenerating the $CO_2$-laden amine-based absorption compound and stripping out $CO_2$ from the $CO_2$-laden amine-based absorption compound, wherein energy is supplied to a stripper to accomplish the regeneration step, and
wherein the amine-based absorption compound is a combination of a primary amine-based absorption compound and two or more different amine-based promoter compounds, and wherein the primary amine-based absorption compound is 2-(2-hydroxyethyl)-piperidine and the two or more amine-based promoter compounds are selected from monoethanolamine, piperazine, 2-(1-piperazinyl)-ethylamine, 1-methylpiperazine, 2-methylpiperazine, 3-methylaminopropylamine, morpholine, piperidine, or suitable combinations of any two or more thereof.

18. The method of claim 17, wherein the amine-based absorption compound is in an aqueous solution having a concentration in the range of about 10 weight percent to about 95 weight percent, based on the total weight of the aqueous solution.

19. The method of claim 17, wherein the amine-based absorption compound is in an aqueous solution having a concentration in the range of about 15 weight percent to about 90 weight percent, based on the total weight of the aqueous solution.

20. The method of claim 17, wherein the amine-based absorption compound is in an aqueous solution having a concentration in the range of about 20 weight percent to about 85 weight percent, based on the total weight of the aqueous solution.

21. The method of claim 17, wherein the amine-based absorption compound is an aqueous solution that contains from about 0.5 weight percent to about 30 weight percent of the two or more amine-based promoter compounds, based on the total amount of the amine-based compounds that form the overall amine-based absorption compound.

22. The method of claim 17, wherein the amine-based absorption compound is an aqueous solution that contains from about 1 weight percent to about 27.5 weight percent of the two or more amine-based promoter compounds, based on the total amount of the amine-based compounds that form the overall amine-based absorption compound.

23. The method of claim 17, wherein the amine-based absorption compound is an aqueous solution that contains from about 2.5 weight percent to about 25 weight percent of the two or more amine-based promoter compounds, based on the total amount of the amine-based compounds that form the overall amine-based absorption compound.

24. The method of claim 1, wherein the amine-based absorption compound is an aqueous solution that contains from about 5 weight percent to about 22.5 weight percent of the two or more amine-based promoter compounds, based on the total amount of the amine-based compounds that form the overall amine-based absorption compound.

\* \* \* \* \*